US006998581B2

(12) United States Patent
Currie

(10) Patent No.: US 6,998,581 B2
(45) Date of Patent: Feb. 14, 2006

(54) DEEP FRYER

(75) Inventor: Neil Anthony Currie, Stourport-on-Severn (GB)

(73) Assignee: 3rd Angle (U.K.) Ltd., Shropshire (GB)

( * ) Notice: Subject to any disclaimer, the term of this patent is extended or adjusted under 35 U.S.C. 154(b) by 0 days.

(21) Appl. No.: 10/490,203

(22) PCT Filed: Oct. 2, 2002

(86) PCT No.: PCT/EP02/11076

§ 371 (c)(1), (2), (4) Date: Sep. 24, 2004

(87) PCT Pub. No.: WO03/030697

PCT Pub. Date: Apr. 17, 2003

(65) Prior Publication Data

US 2005/0061159 A1 Mar. 24, 2005

(30) Foreign Application Priority Data

Oct. 2, 2001 (DE) .......................... 201 16 149 U

(51) Int. Cl.
*A47J 37/12* (2006.01)

(52) U.S. Cl. ......................... 219/430; 219/432; 99/403

(58) Field of Classification Search ..................... None
See application file for complete search history.

(56) References Cited

U.S. PATENT DOCUMENTS

| | | | | |
|---|---|---|---|---|
| 3,712,289 | A | 1/1973 | Reid et al. | |
| 3,908,111 | A | 9/1975 | Du Bois et al. | |
| 4,591,698 | A | 5/1986 | Chang | |
| 5,245,159 | A | 9/1993 | Chang | |
| 5,568,765 | A * | 10/1996 | Andoh et al. | 99/403 |
| 6,365,878 | B1 * | 4/2002 | Lau et al. | 219/430 |
| 6,666,131 | B1 * | 12/2003 | Bizard | 99/403 |
| 6,742,444 | B1 * | 6/2004 | Lai et al. | 219/430 |

FOREIGN PATENT DOCUMENTS

| | | | |
|---|---|---|---|
| EP | 0 067 730 | A | 12/1982 |
| EP | 0 138 249 | A | 4/1985 |
| EP | 0 168 359 | A | 1/1986 |
| EP | 0 704 188 | A | 4/1996 |
| EP | 1 025 788 | A | 8/2000 |

* cited by examiner

*Primary Examiner*—Joseph Pelham
(74) *Attorney, Agent, or Firm*—Bacon & Thomas, PLLC

(57) ABSTRACT

The invention relates to a deep-fat fryer having a frying vessel (17) and at least one heating element (26) arranged in the frying vessel (17). The frying vessel accommodates a frying medium, for example frying fat or oil, the heating element first of all melting the latter, if appropriate, and then heating it to a temperature of from typically 100 to 200° C., in particular of from 150 to 190° C. In the case of known deep-fat fryers, the frying vessel usually consists of metal, for example stainless steel, enameled steel or coated, non-coated or anodized aluminum. In contrast, the deep-fat fryer according to the invention is characterized in that the frying vessel (17) consists, at least in part, of a transparent or see-through material, which allows visual monitoring of the frying process.

20 Claims, 5 Drawing Sheets

FIG. 3
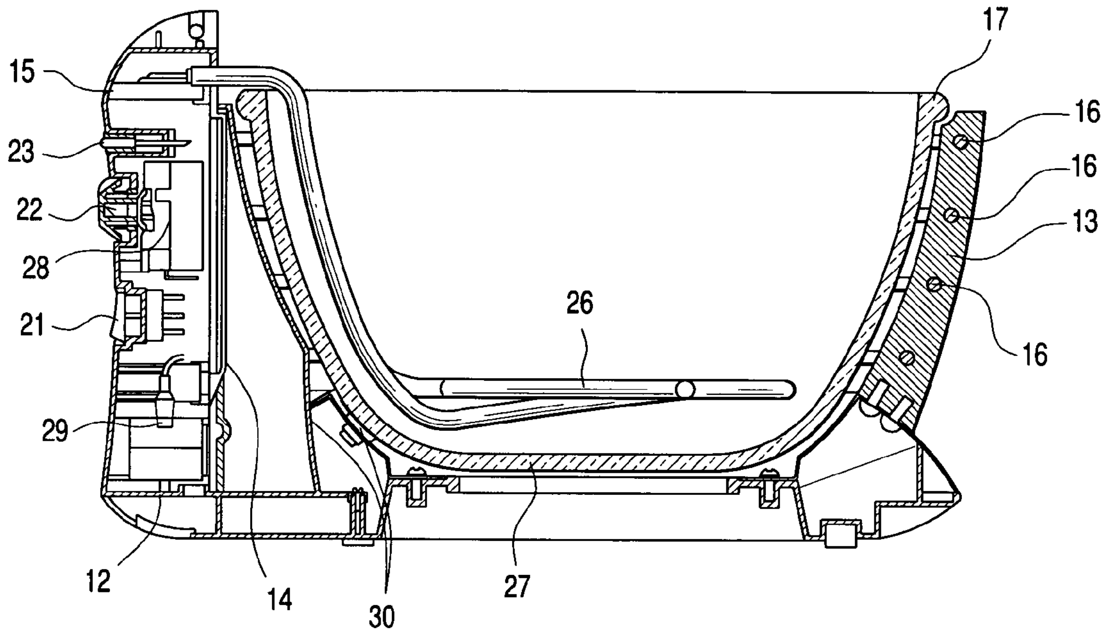
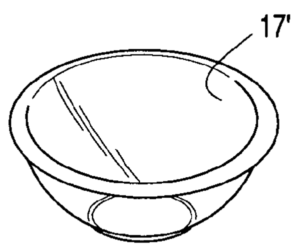
FIG. 4
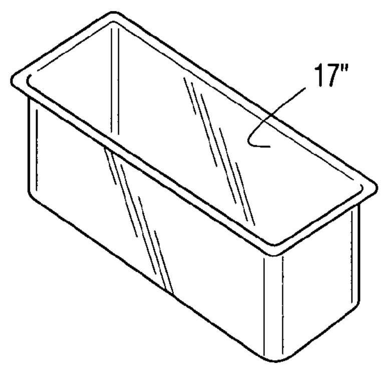
FIG. 5
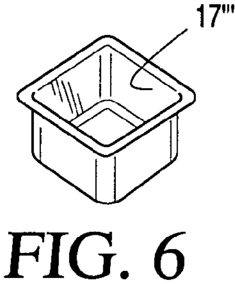
FIG. 6
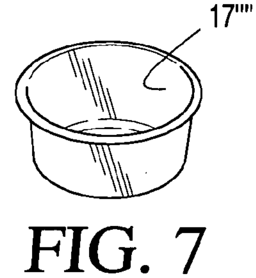
FIG. 7

DEEP FRYER

The invention relates to a deep-fat fryer having a frying vessel and at least one heating element arranged in the frying vessel.

Such deep-fat fryers are known. The frying vessel accommodates a frying medium, for example frying fat or oil, the heating element first of all melting the latter, if appropriate, and then heating it to a temperature of from typically 100 to 200° C., in particular of from 150 to 190° C. A wide range of different foodstuffs, referred to here as items for frying, such as meat, fish, onion rings, mushrooms, vegetables, chips and the like can be fried within a period of a few minutes in the heated fat or oil. The term "frying" in the present context covers any method of treating foodstuffs in hot fat or oil. Use is usually made, for the purpose of frying, of a basket which accommodates the items for frying and may consist, for example, of a wire mesh. The basket ensures that the items for frying can be reliably and easily submerged in the hot oil or fat and removed again following completion of the frying process. The excess fat or oil can drip off through the wire mesh.

Numerous deep-fat fryers, for example the deep-fat fryer described by the applicant in German patent application DE 197 14 038 A, has a heating element which is firmly connected to the frying vessel. The heating element is then usually fastened beneath the frying vessel, with the result that first of all the frying vessel, and then the oil or fat located in the frying vessel, is heated. In this case, the frying vessels have to have good thermal conductivity and thus usually consist of metal. In order to protect the user, in the case of such appliances, the frying vessel is usually enclosed by an insulating housing in order to avoid the risk of the user accidentally coming into contact with the hot frying vessel.

Frying vessels in the case of which the heating element is arranged in the interior of the frying vessel are also known. Advantages of this type of appliance are that the heating element is in direct contact with the fat or oil, this ensuring that the frying medium heats up more quickly. The heating element is typically designed as a heating coil, with the result that smaller residues of the items for frying can pass the heating element and sink to the base of the frying vessel. Such particles and food residues are then located in the cooler base region of the frying vessel rather than in the immediate vicinity of the heating element. During the subsequent frying processes, such residues thus burn and disintegrate to a considerably lesser extent than is the case, for example, for frying vessels with base heating. The frying fat or oil can then be used for a longer period of time because it does not contain as many disintegrated food residues. Even in the case of the deep-fat fryer with the heating element arranged in the frying vessel, though, the frying vessel itself usually consists of metal, for example stainless steel, enameled steel or coated, non-coated or anodized aluminum.

When using the known deep-fat fryers, the user cannot tell either whether the frying fat has already melted, and the heating output can thus be increased, or whether the item for frying has already reached the desired degree of browning and the frying process can thus be completed. The user is thus frequently forced to open the lid of the deep-fat fryer in order to monitor the frying process. It is usually even necessary to remove the frying basket in order to monitor visually the items for frying. This is not just laborious and time-consuming, but also involves the risk of the correct time for completing the frying process passing and the items for frying consequently burning. In addition, frequent handling of foodstuffs having a high moisture content involves the risk of burning by splashes of fat.

The object of the present invention is thus to provide a deep-fat fryer which allows straightforward monitoring of the frying process. The intention here is to ensure that the user is sufficiently protected against splashes of fat, and also against accidental contact with the hot frying vessel.

This object is achieved by the deep-fat fryer having the features of the present claim 1. Advantageous developments of the deep-fat fryer according to the invention form the subject matter of the dependent claims.

Accordingly, the present invention relates to a deep-fat fryer having a frying vessel and at least one heating element arranged in the frying vessel, characterized in that the frying vessel consists, at least in part, of a transparent or translucent material. The use of an at least partially transparent or translucent frying vessel makes it possible for the user to follow the frying process directly and to monitor the degree of browning of the items for frying which are floating in the hot oil or fat. Intervention on the part of the user is only necessary at the end of the frying process, with the result that the risk of injury is reduced to a considerable extent and the risk of burning the items for frying is vastly reduced. Since, in the case of all the commercially available deep-fat fryers known to the applicant, the frying vessel consists of opaque metal and visual monitoring of the items for frying in the hot oil is not possible, it was surprising to realize, by the solution according to the invention, a deep-fat fryer which allows such monitoring and, at the same time, maintains the functionality and operational reliability of conventional deep-fat fryers.

According to a preferred embodiment of the invention, the frying vessel consists entirely of a transparent or translucent material, with the result that optimum visual monitoring of the frying process through the lateral circumference of the frying vessel is ensured. Turbulence and bubbling surfaces of the frying medium, which prevent visual monitoring from above in the case of conventional deep-fat fryers, do not obstruct the monitoring process in the case of the deep-fat fryer according to the invention. The frying vessel preferably consists of glass, for example a heat-resistant safety glass, a temperature-resistant transparent plastic material or else a translucent metal or a metal alloy. It is also possible for the frying vessel to consist of a combination of these materials, although frying vessel made of glass or plastic are preferred. The frying vessel may or may not be colored, for example dyed or painted, as long as optimum monitoring of the items for frying is not significantly impaired. The term "temperature-resistant" in the present context means that, up to typical frying temperatures of approximately 200° C., the transparent plastic is essentially dimensionally stable, does not soften and also does not disintegrate. The heating element is advantageously arranged in the region of the base of the frying appliance. It is particularly preferable for the heating element to be removable, with the result that the transparent frying vessel can easily be cleaned. The heating element may be arranged, for example, in the form of a heating coil. The heating element is advantageously connected to a holder which can be fitted, or fastened in some other way, for example on the outside of the frying vessel. A thermostat for controlling the heating output of the heating element is advantageously arranged in the holder. For this purpose, it is possible to provide, for example, one or more temperature sensors, which are arranged in the vicinity of the heating element, advantageously directly on the heating element, and are in thermal contact therewith. Suitable operating elements which allow the heating element to be switched on and off may be arranged on the holder. The heating element is usually operated electrically, with the result that the operating elements activate the electrical contact with a power cable opening out into the holder. Since an optimum frying result requires different frying temperatures for different foodstuffs, the frying temperature can preferably be adjusted by the user. For this purpose, the deep-fat fryer may have, on the holder for the heating element, a temperature controller which can be adjusted by the user and, in turn, controls the thermostat. It is usually the case that frying fat, with a very low heating output, is first of all melted and then the liquid fat, or a liquid oil which is already at room temperature, is heated up to the actual frying temperature, which is usually between 100 and 200° C. The thermostat usually also comprises suitable fuses which interrupt the power supply if a predetermined temperature limit value, for example 210° C., is exceeded.

If the frying oil being worked with is at a temperature of almost 200° C., there is a considerable risk of injury to the user if he/she unintentionally comes into contact with the frying vessel. The outer shell of the deep-fat fryer, which is accessible to the user, should thus always be at a considerably lower temperature than the frying medium. In the case of the deep-fat fryer according to the invention, the frying vessel preferably consists of glass or a transparent plastic, i.e. of materials which have a usually a relatively low thermal conductivity. The frying vessel may thus be designed, for example, in a double-walled manner with an evacuated interspace, with the result that the temperature level of the outer wall is considerably lower than the temperature of the frying medium. It is particularly preferable, however, for the frying vessel to be arranged in a housing, which prevents the user from coming into direct contact with the hot frying vessel. In order to maintain the advantage of visual monitoring of the frying process, the housing likewise has to be at least partially transparent or see-through. It is thus possible for the housing to consist, at least in part, of a see-through plastic material. The housing, however, may also have, for example, metal or plastic struts, between which there are open interspaces, through which the user can see into the interior of the frying vessel. The dimensions of, and spacings between, the struts here are selected such that, on the one hand, unobstructed visual monitoring is ensured and, on the other hand, the user's hands are prevented from accidentally coming into contact with the frying vessel. The struts may be designed, for example, as horizontally running rings or ring segments. The frying vessel is advantageously arranged in the housing such that the thermal contact between the frying vessel and housing is minimized. There are thus preferably only a few points of contact between the frying vessel and housing, at which it is possible to arrange, for example, silicone or Teflon plates or the like, which further reduce the coefficient of heat transfer between the frying vessel and housing and form a softer bearing means than, for example, the metal struts themselves. It is particularly preferred for the frying vessel to be arranged in a removable manner in the housing, which further simplifies the task of cleaning the deep-fat fryer according to the invention.

For the safety considerations mentioned above, it is possible for the deep-fat fryer according to the invention to be additionally enclosed on the outside, at least in part, by a protective casing. The protective casing, in the event of the frying vessel being damaged, prevents fragments of the vessel or hot fat from being able to shoot out laterally and harm the user.

The protective casing preferably consists of a transparent or translucent material, for example of plastic, glass or a combination of these materials, a protective casing made of plastic being particularly preferred. The protective casing, likewise, may or may not be colored. The protective casing is always configured such that the view of the items for frying floating in the see-through or translucent frying vessel is not impaired.

The protective casing preferably encloses the frying vessel in the lateral region and is designed such that, in the case of the frying vessel being damaged, the oil is channeled downward in a controlled manner into the base region of the deep-fat fryer. For this purpose, the protective casing may have a closed base region and thus enclose the frying vessel in a hemispherical manner. It is preferable, however, for the base region of the protective casing to be open, with the result that the oil can flow into the base region of the deep-fat fryer. The base region of the deep-fat fryer may likewise be closed or, preferably, provided with possibly closeable outlet openings, via which the oil can flow out. The base region of the deep-fat fryer is preferably always designed such that, once the frying vessel has been damaged, the maximum oil level drops beneath the heating device and the electrical controls, with the result that the deep-fat fryer is electrically safe even in the event of malfunctioning.

If outlet openings are arranged in the base region of the deep-fat fryer or in the base region of the protective casing, filter means, for example small-diameter openings, screens, lattices or grilles or also porous filter materials, will preferably be provided, these controlling the outflow of the oil in the downward direction from the deep-fat fryer and retaining, in particular, fragments of the frying vessel, with the result that it is possible to avoid the user being put at risk, for example, by splinters of glass. The oil preferably flows out slowly enough for it to be able to cool to a great extent and thus for any risk or injury by hot oil to be eliminated. The filter means may consist of porous glass materials, for example a silicate aerogel, a plastic material, metal or a woven fabric.

Fastening means are preferably provided for fixing the protective casing in the deep-fat fryer. The fastening means are advantageously designed as securing means which fix the protective casing on the housing of the deep-fat fryer. The protective casing may be fastened in a permanent or releasable manner on the housing. In particular in the latter case, the protective casing is preferably of washable, for example dishwasher-safe, design.

An air gap is advantageously defined between the frying vessel and the protective casing, said air gap ensuring effective thermal separation between the protective casing and the frying vessel, which is hot when in operation, with the result that the protective casing, which is possibly accessible from the outside, can be kept at a considerably lower temperature. A few spacers with low thermal conductivity may be arranged between the frying vessel and the protective casing. It is particularly preferable for the fastening means for the protective casing to serve, at the same time, as spacers for the frying vessel. The fastening means may be designed, for example, such that they retain the frying vessel on their inside and/or at their top border or their top edge.

The deep-fat fryer according to the invention preferably also comprises a removable basket for the items for frying. It is likewise advantageous to provide a removable lid, which may have, for example, suitable sealing lips which rest on the border of the frying vessel.

The frying vessel of the deep-fat fryer according to the invention may be in a wide range of different shapes, for example it may be of hemispherical, cuboidal or cylindrical design.

The invention is explained in more detail hereinbelow with reference to exemplary embodiments illustrated in the attached drawings.

In the drawings:

FIG. 3 shows a cross section of the deep-fat fryer of FIG. 1;

FIGS. 4–7 show variants of the transparent or translucent frying vessels of the deep-fat fryer according to the invention;

Figure 1:
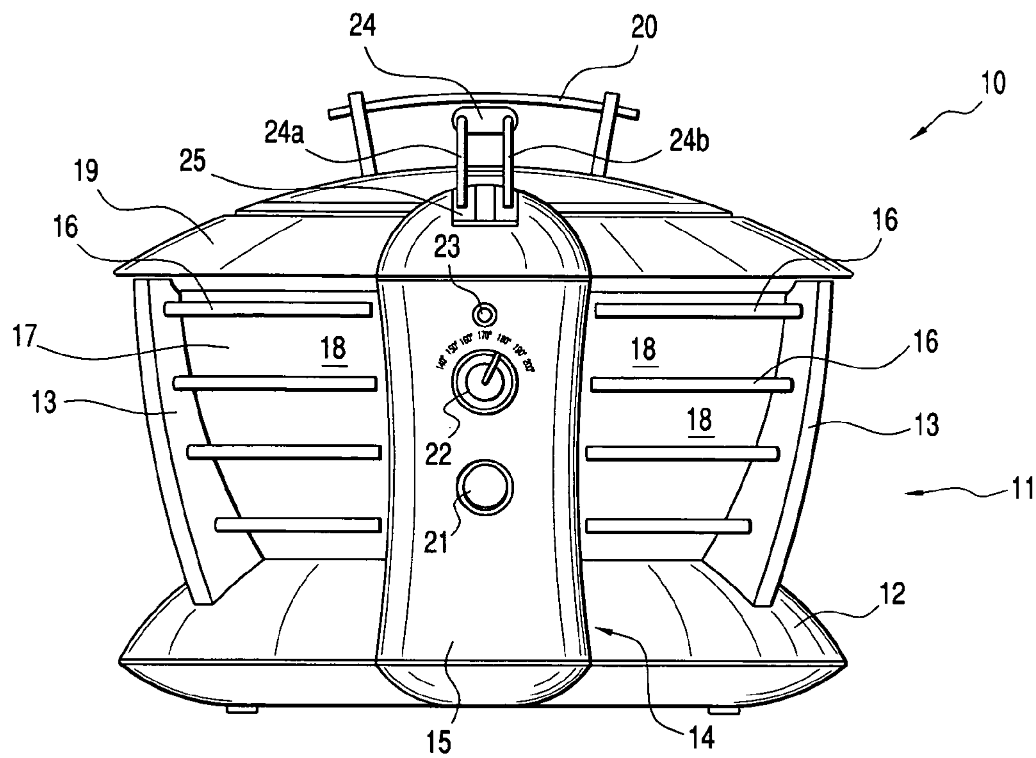
FIG. 1 shows an end view of a first embodiment of the deep-fat fryer according to the invention.

FIG. 1 shows an end view of a preferred embodiment of the deep-fat fryer 10 according to the invention. The deep-fat fryer 10 has a housing 11 which comprises a base plate 12 from which vertical carriers 13 extend upward. One of the vertical carriers is designed as a rail 14 for a holder 15 of a heating element (not illustrated in FIGS. 1 and 2). The rail 14 is clearly visible, in particular, in the side view of FIG. 2. Securing struts 16 are formed between the carriers 13, 14. A transparent frying vessel 17 is arranged in the pot-like housing 11 formed by the base plate 12, the vertical carriers 13, 14 and the horizontal securing struts 16. There is a free space 18 between the horizontal securing struts 16, and this free space makes it possible for the user to monitor visually the items for frying (not illustrated in the figures) floating in hot oil in the frying vessel 17. A removable lid 19, which has a handle 20, is arranged on the deep-fat fryer 10. An on/off switch, designed as a toggle switch 21, and a temperature controller 22 for adjusting the desired frying temperature are arranged on the holder 15. The temperature controller 22 interacts with a thermostat arranged in the interior of the holder 15. An operating light 23 indicates whether the deep-fat fryer 10 is switched on. The illustration of FIGS. 1 and 2 also shows a handle 24 belonging to a frying basket which, for the sake of clarity, is not illustrated specifically. In the storage state illustrated in FIGS. 1 and 2, the handle 24 has been swung back in a space-saving manner and, for use purposes, can be swung out in the direction of the arrow illustrated in FIG. 2 and anchored in a recess 25 of the holder 15. In order to remove the frying basket, the struts 24*a* and 24*b* can easily be pressed together and released from the anchoring in the recess 25 of the holder 15.

Figure 2:
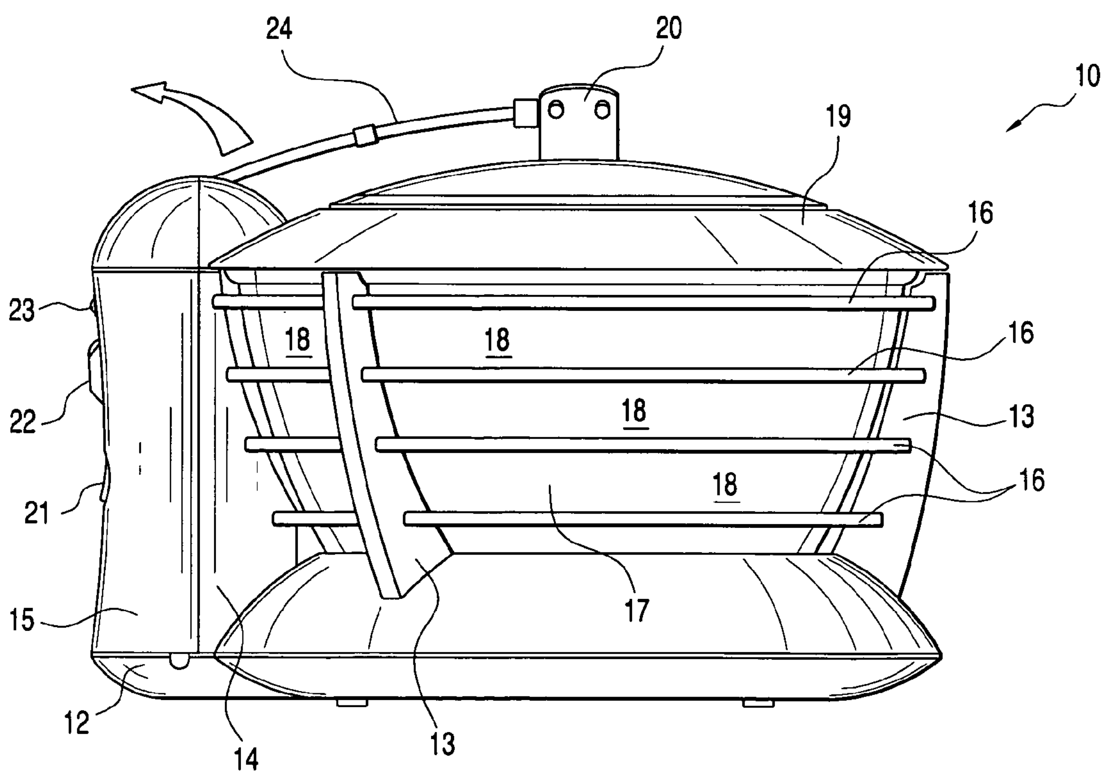
FIG. 2 shows a side view of the deep-fat fryer of FIG. 1.

FIG. 2 shows a side view of the deep-fat fryer 10 of FIG. 1, the same components being provided with the same designations.

FIG. 3 shows the deep-fat fryer in the same orientation as in FIG. 2, but in cross section. It is possible to see the transparent frying vessel 17, in which a heating element 26, which is connected to the holder 15, is arranged in a removable manner. When the heating element 26 is inserted into the frying vessel 17, the holder 15 is positioned on the rail 14 and strikes against the base plate 12. This ensures both a constant orientation of the heating element 26 and a constant spacing between the heating element and the base region 27 of the frying vessel 17. The thermostat 28 and a safety thermostat, which can be reset manually via a push-button 29, are arranged in the holder 15. The thermostats are connected to temperature sensors (not illustrated) which are mounted in the region of the heating coil of the heating element 26. The cross-sectional illustration of FIG. 3 shows that the frying vessel 17 is only in contact with the housing 11 at a few points 30. The points of contact 30 may be designed as Teflon or silicone plates, which further reduce the thermal contact.

FIGS. 4–7 illustrate a wide range of different embodiments 17', 17", 17"", 17"" of the frying vessel 17.

Figure 8:
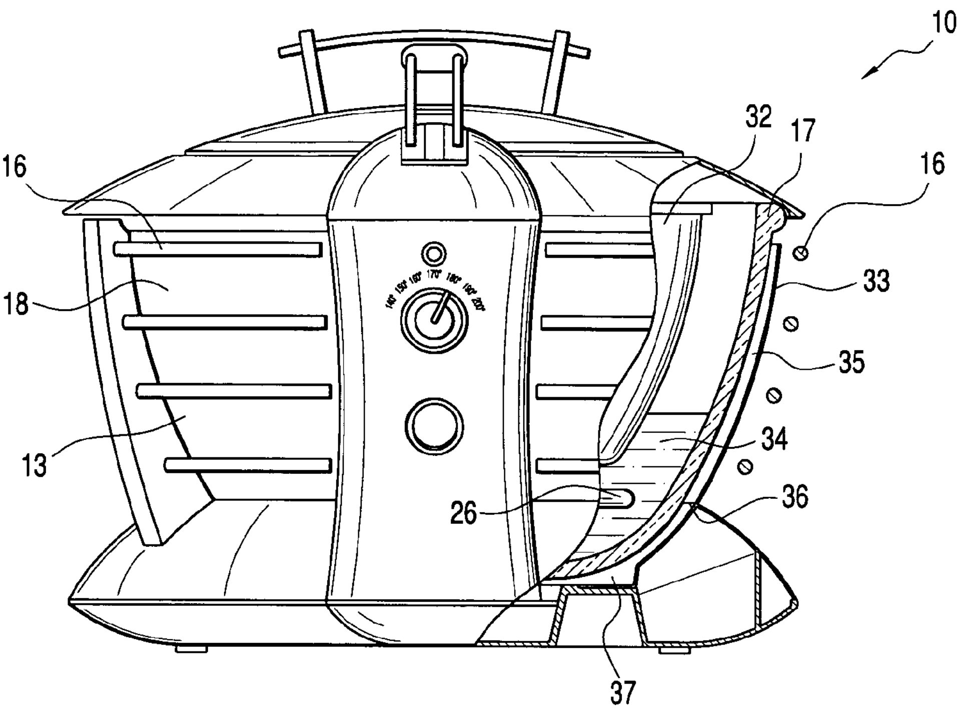
FIG. 8 shows an end view of a second embodiment of the deep-fat fryer according to the invention, partly in section.

FIG. 8 illustrates an end view of a second embodiment of the deep-fat fryer according to the invention, partly in section. Components corresponding to components which have already been explained above with reference to the deep-fat fryer 10 of FIGS. 1 to 3, or which fulfill a corresponding function, are provided with the same designations and are only described briefly, if at all, hereinbelow. The deep-fat fryer 10 of FIG. 8 corresponds for the most part to the deep-fat fryer of FIGS. 1 to 3, although the removable frying basket 32 is also shown, in addition, partly in section. As a significant contrast to the deep-fat fryer of FIGS. 1 to 3, the deep-fat fryer of FIG. 8 has a protective casing 33 made of a transparent plastic material, for example of Plexiglas, which encloses the frying vessel 17 on the outside. Should the frying vessel 10 be broken, for example, by incorrect use, the protective casing 33 effectively prevents fragments of glass from being able to shoot laterally outward, or hot oil 34 from being able to splash laterally outward, through the open interspaces 18 between the annular metal struts 16. An air gap 35 is formed between the frying vessel 17 and the protective casing 33 and gives rise to thermal separation between the frying vessel and protective casing, with the result that, even when the deep-fat fryer is in operation, the protective casing 33 is only heated to a moderate extent. The protective casing 33 is open in its bottom region 36, and the oil 34 which escapes in the event of damage can thereby be channeled into the bottom region 37 of the deep-fat fryer 10.

Figure 9:
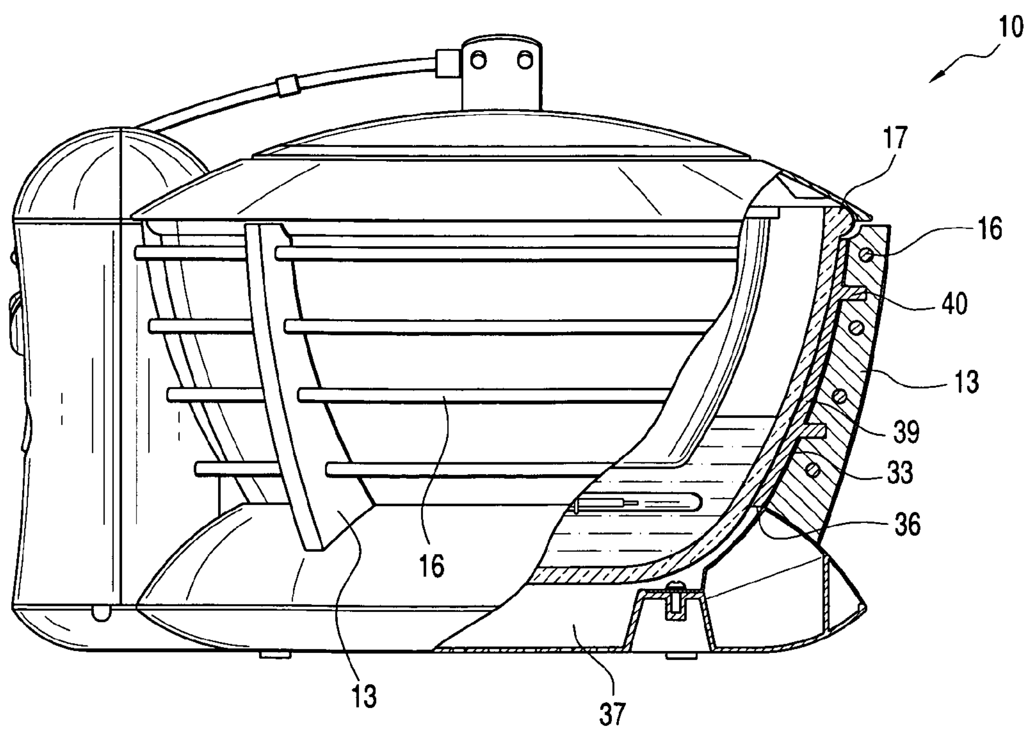
FIG. 9 shows a side view of the deep-fat fryer of FIG. 8, partly in section.

FIG. 9 shows a side view of the deep-fat fryer of FIG. 8, partly in section. It can be seen, in particular, that small-diameter openings 38 are provided in the bottom region 37 of the deep-fat fryer, said openings, on the one hand, allowing the oil to escape slowly and in a controlled manner and, on the other hand, acting as filter means which retain fragments of the frying vessel 17. Also provided is a holder 39 which serves as fastening means for fixing the protective casing 33 and has protruding pins 40 which engages, through corresponding bores in the protective casing 33, in depressions which are made in the carriers 13. It is possible for the pins 40 to be retained by a press fit or to be adhesively bonded on a permanent basis in the depressions. In the former case, it is also possible for the protective casing 33 to be fastened in a releasable manner. As can be seen, the holder 39 serves, at the same time, as a spacer for the frying vessel 17, in order thus to ensure the air gap 35. In the variant of FIGS. 8 and 9, the inner contour of the holder 39 is adapted essentially to the inner contour of the frying vessel 17, with the result that the vessel 17 rests on the inside of the holder 39.

Figure 10:
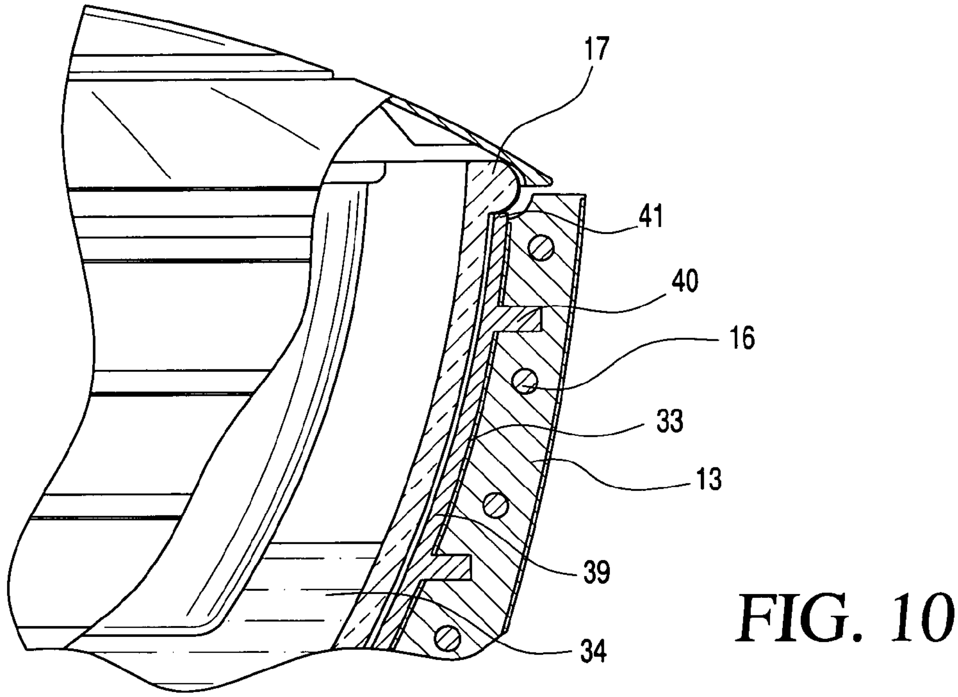
FIG. 10 shows a detail of a variant of the deep-fat fryer of FIGS. 8 and 9, partly in section.

In contrast, in the case of the variant illustrated in FIG. 10, the frying vessel 17 is borne by the top edge 41 of the holder 39, with the result that a certain air gap 35 is also present in the region of the holder.

Figure 11:
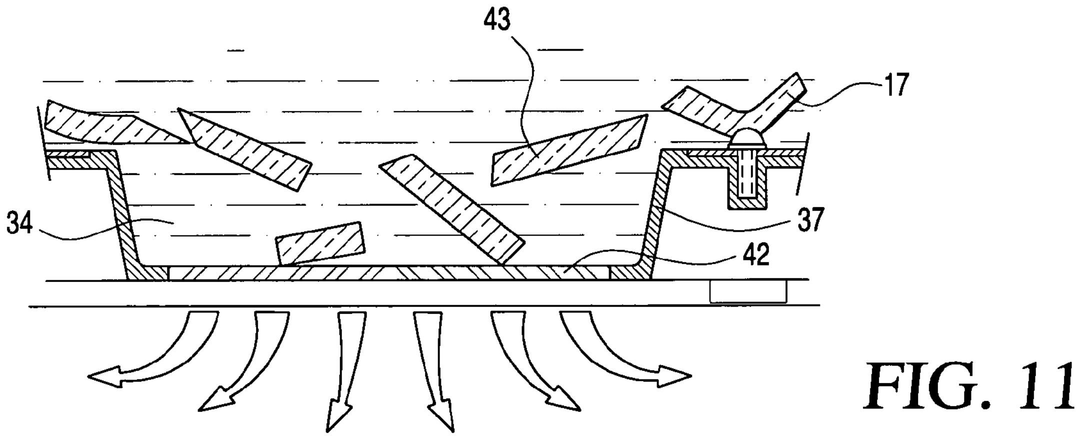
FIG. 11 shows a detail of the further variant of the deep-fat fryer of FIGS. 8 and 9, in cross section.

FIG. 11 illustrates a variant of the base region of the deep-fat fryer of FIGS. 8 and 9, in cross section, in the case of which the filter means of the outlet openings are designed as a grille-like screen or lattice 42. As can be seen, in the illustration of FIG. 11, the frying vessel 17 has been broken, but the filter means effectively retain the fragments of glass 43, while the oil 34, as is illustrated by the arrows, can flow out downward.

Figure 12:
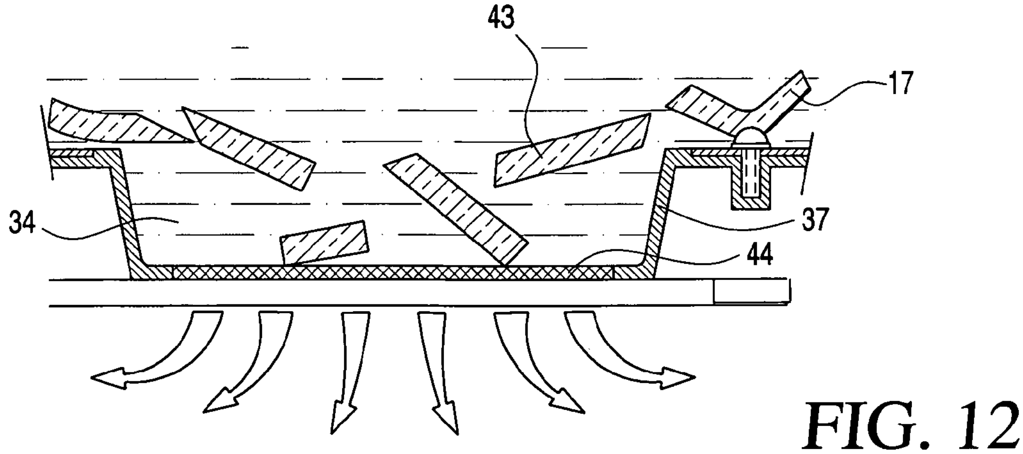
FIG. 12 shows a detail of yet a further variant of the deep-fat fryer of FIGS. 8 and 9, in cross section.

FIG. 12 shows a further variant of the deep-fat fryer according to the invention in an illustration corresponding to FIG. 11. In the case of this variant, the filter means are designed as a porous filter material 44.

Figure 13:
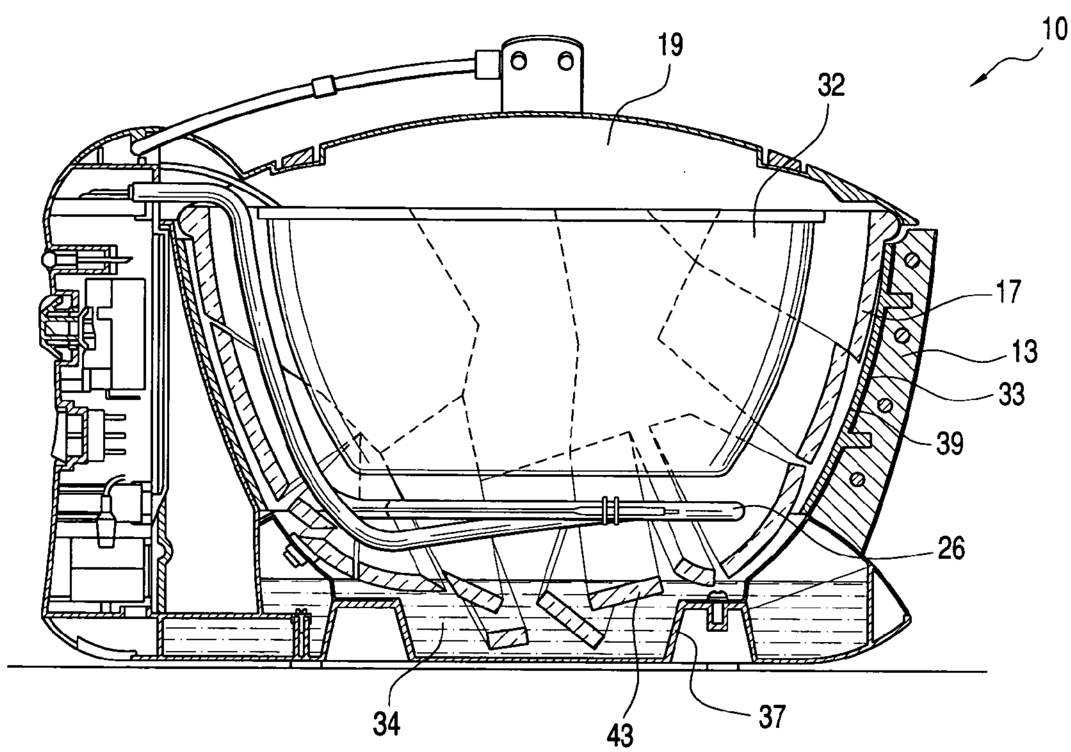
FIG. 13 shows a further variant of the deep-fat fryer of FIGS. 8 and 9, in cross section.

In the case of that embodiment of the deep-fat fryer according to the invention which is illustrated, finally, in FIG. 13, the base region 37 of the deep-fat fryer is closed, with the result that, in the event of malfunctioning which is illustrated, the frying vessel 17 having shattered into numerous fragments 43, the oil 34 cannot flow out of the housing. Nevertheless, the oil is distributed in the base region 37 of the deep-fat fryer such that since maximum oil level is a considerable way below the level of the heating coil 26 of the deep-fat fryer.

The invention claimed is:

1. Deep fat fryer comprising a vessel and at least one heating element arranged in said vessel, said vessel being made entirely from a transparent or translucent material, and a protective guard made from a transparent or translucent material being provided at least partially circumferentially around said vessel.

2. Deep fat fryer according to claim 1, wherein said protective guard is made from one or more of the group consisting of plastic and glass.

3. Deep fat fryer according to claim 2, wherein the protective guard is colored.

4. Deep fat fryer according to claim 1, wherein the protective guard is provided with a closed bottom.

5. Deep fat fryer according to claim 1, wherein a discharge aperture is provided in the bottom part of said protective guard.

6. Deep fat fryer according to claim 5, including a filter in said discharge aperture of said bottom part.

7. Deep fat fryer according to claim 1, including a fixing device adapted to maintain said protective guard in said fryer.

8. Deep fat fryer according to claim 1, wherein an air gap is provided between said vessel and said protective guard.

9. Deep fat fryer according to claim 7, wherein said fixing device comprises spacers for said vessel.

10. Deep fat fryer according to claim 7, wherein said protective guard is removably arranged in said fryer.

11. Deep fat fryer according to claim 1, wherein the transparent or translucent material is made of one or more of the group consisting of glass, a temperature resistant plastics, and metal.

12. Deep fat fryer according to claim 1, wherein the vessel is colored.

13. Deep fat fryer according to claim 1, wherein the heating element is removably arranged near the bottom of the vessel.

14. Deep fat fryer according to claim 13, wherein the heating element is connected to a mount which comprises a thermostat for controlling the heating output of said heating element.

15. Deep fat fryer according to claim 1, including at least partially transparent housing which accommodates said vessel.

16. Deep fat fryer according to claim 15, wherein the housing is at least partially made from a transparent plastics.

17. Deep fat fryer according to claim 15, wherein the housing comprises metallic and/or plastic struts with a clear spacing being provided between said struts.

18. Deep fat fryer according to claim 15, wherein said vessel is removably arranged in said housing.

19. Deep fat fryer according to claim 1, wherein said fryer comprises a removable basket which accommodates goods to be fried.

20. Deep fat fryer according to claim 1, wherein said vessel is provided with a removable lid.

* * * * *